United States Patent [19]

Schulze

[11] Patent Number: 4,787,000
[45] Date of Patent: Nov. 22, 1988

[54] HEAD LIFTER FOR DISK DRIVE

[76] Inventor: Dieter M. Schulze, 18956 Sara Park Cir., Saratoga, Calif. 95070

[21] Appl. No.: 71,001

[22] Filed: Jul. 8, 1987

[51] Int. Cl.$^4$ .................. G11B 5/54; G11B 21/22; G11B 21/16
[52] U.S. Cl. ............................. 360/105; 360/104
[58] Field of Search ............... 360/105, 104, 97-99

[56] References Cited

U.S. PATENT DOCUMENTS

| | | | |
|---|---|---|---|
| 3,646,536 | 2/1972 | Bleiman | 360/105 |
| 3,984,873 | 10/1976 | Pejcha | 360/105 |
| 4,218,714 | 8/1980 | Isozaki et al. | 360/105 |
| 4,376,294 | 3/1983 | Meir et al. | 360/105 |
| 4,661,873 | 4/1987 | Schulze | 360/105 |

Primary Examiner—Robert S. Tupper
Attorney, Agent, or Firm—Townsend & Townsend

[57] ABSTRACT

An improved head lifting mechanism for a hard disk drive which lifts multiple heads away from the top and bottom surfaces of disks. Two opposing lifter arms are used with one end of a first lifter arm extending between a head arm and the top surface of a disk while one end of the other lifter arm extends between another head arm and the bottom surface of a disk. The head arms are biased away from each other by a spring to separate the heads from the disk. An electromagnet pulls the lifter arms towards each other during operation of the disk drive so that the heads are not separated from the disks.

10 Claims, 2 Drawing Sheets

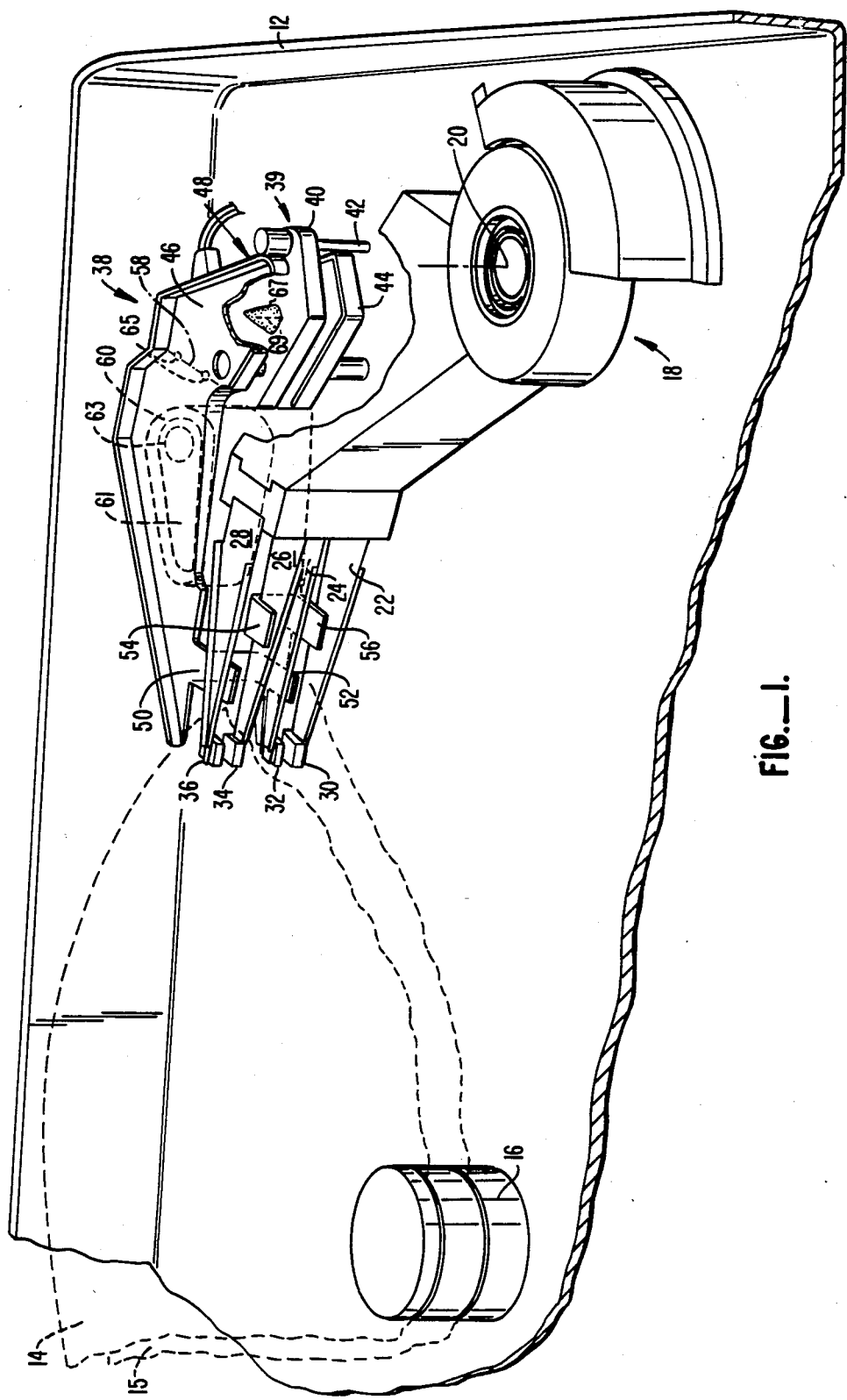
FIG._1.

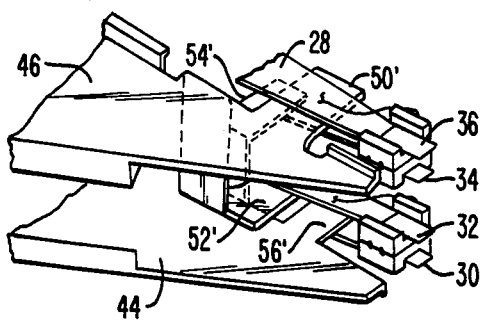
FIG._2.
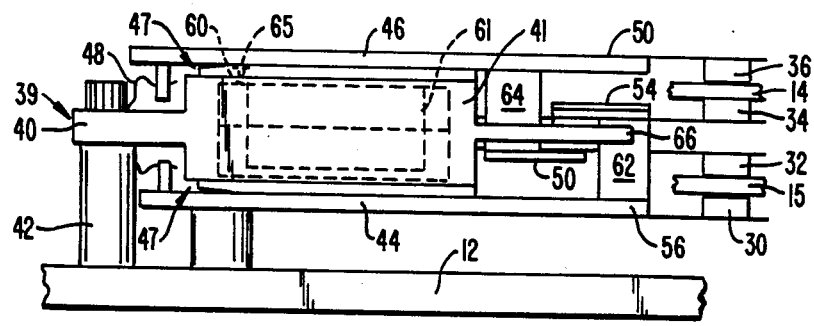
FIG._3A.
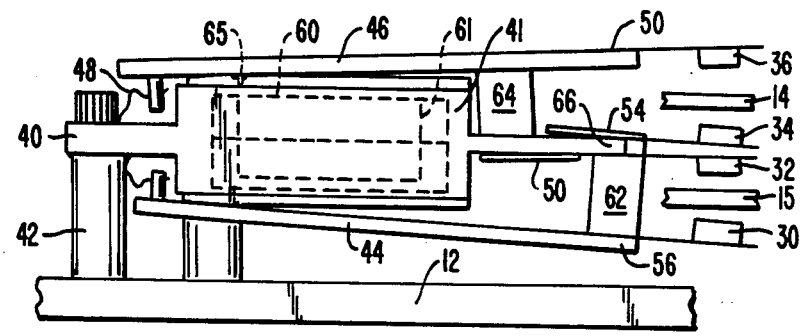
FIG._3B.

HEAD LIFTER FOR DISK DRIVE

BACKGROUND

The present invention relates to mechanisms for holding the heads of a hard disk drive away from the disks when the disk drive is not in operation.

The heads used in a hard disk drive are attached to the end of a head arm and are above the disks of the disk drive. In operation, the heads ride on a cushion of air generated by the rapid spinning of the disks so that the heads will not actually touch the disks. When the disk drive is not in operation, it is desirable to move the heads away from the disks so that the disks will not be damaged by the disk drive being bumped and moved about while being transported.

One way to lift a head from a disk is to use a mechanism on the head arm itself. Such a mechanism is shown in U.S. Pat. No. 4,376,294 to Meier, et al. Meier shows a head assembly whih includes a spring-like lift bail mounted on the head assembly. By extending a finger forward to contact the rear end of the lift bail, a spring action causes the front end of the head arm containing the head to raise up.

Another head lifting method is shown in U. S. Pat. No. 3,984,873 to Pejcha. In the Pejcha device, a pair of head arms extend past the head and are forced into a U-shaped member, which, by a scraping motion as the arm is forced into the member, causes the arms to move away from the disks.

Another mechanism is shown in U.S. Pat. No. 3,646,536 to Bleiman. Bieiman shows a pair of wings 30, 31 which use a twisting movement to scrape against the head arms and force them away from the disks.

U.S. Pat. No. 4,218,714 to Isozaki shows a mechanism for lifting a head in a floppy disk drive. The two nead arms of Isozaki are coupled at adjacent ends so that when one head arm is lifted it causes the other head arm to lift away from the disk. The first head arm is lifted by an arm extending under the head arm. The lifting arm is pivoted through the use of a spring connected to the other end of tne lifting arm. The head arm is released by the use of an electric magnet which pulls the lifting arm down against the force of the spring.

SUMMARY OF THE INVENTION

The present invention is directed to an improved head lifting mechanism for a hard disk drive which lifts multipie heads away from the top and bottom surfaces of a number of stacked disks. Two opposing lifter arms are used with a first end of a first lifter arm exteding between a head arm and the top surface of a disk while a first end of the other lifter arm extends between another head arm and the bottom surface of a disk. The head arms are biased away from each other by a spring to separate the heads from the disk. An electromagnet pulls the lifter arms toward each other during operation of the disk drive so that the heads are not separated from the disks.

In a preferred embodiment, a spring is attached to a second end of the lifter arms to pull the second ends towards each other. This causes the head arms to rotate about a pivot axis so that the first ends of the lifter arms move away from each other. An electromagnet is located between the lifter arms and between the pivot point and the first end of the lifter arms. The electromagnet operates on an iron plate contained in each lifter arm to move the arms toward each other and thus move each head toward a disk. The first end of each lifter arm has a plurality of members extending outward so that a number of heads can be lifted. For instance, in a two disk drive system, the top lifter arm will have two members, wrth each member extending between the top surface of one of the disks and the associated head arm. Similarly, the bottom lifter arm will have two members with each member extending between the bottom surface of one of the disks and the associated head arm.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view of a portion of a drsk drive incorporating an embodiment of a head lifter mechanism according to the present invention;

FIG. 2 is a perspective view of the front end of the lifter arms of FIG. 1 showing a preferred arrangement of the extending lift members;

FIGS. 3A and 3B are side views of the lifter arm mechanism of FIG. 1 showing the positions of the lifter arms when held together, and when separated to lift the heads, respectively.

DETAILED DESCRIPTION OF THE PREFERRED EMBODIMENTS

FIG. 1 shows a portion of a rigid disk drive incorporating a head lifter mechanism according to the present invention. The disk drive is housed within a casing 12. A pair of disks 14, 15 (shown in phantom) are mounted in a stack on a rotatable spindle 16. A pivot arm assembly 18 rotates about a pivot axis 20 to cause head arms 22, 24, 26 and 28 to move heads 30, 32, 34 and 36 from the outer to the inner edges of disks 14.

A head lifter mechanism 38 has a support structure 39 which is mounted to the disk drive casing by a stud 42. A pair of lifter arm plates 44 and 46 are mounted below and above support structure 39 and are joined by a spring 48 at one end. Top lifter arm plate 46 includes a pair of projecting members 50, 52. Member 50 extends between head arm 28 and the top surface of disk 14, while member 52 extends between head arm 24 and the top surface of disk 15. Similarly, lower head lifter plate 44 includes a pair of members 54, 56. Member 54 extends between the bottom surface of drsk 14 and the top surface of head arm 26, while member 56 extends between the bottom surface of disk 15 and the top surface of head arm 22.

In operation, spring 48 pulls the back ends of plates 46 and 44 together, causing them to pivot about a line 58 (FIG. 1). This causes the front ends of plates 44 and 46 to separate and members 50 and 52 to lift, thereby lifting head arms 24 and 28 away from the top surfaces of disks 15 and 14, respectively. At the same time, members 54 and 56 are forced downward to push head arms 26 and 22 away from the bottom surfaces of disks 14 and 15, respectively. An electromagnet coil 60 (shown in phantom in FIG. 3A) is used to pull plates 44 and 46 towards each other when the disk drive is in operation so that members 50-56 will not impede the movement of head arms 22-28.

Electromagnetic coil 60 has a core 61 with a hollowed space 63. Hollowed space 63 reduces the amount of flux near pivot line 58, thus evening out the force of coil 60 times the lever arm distance to the pivot line to insure a gentle closing of plates 44, 46. A pair of dimples 65 (shown in phantom) on the bottom side of plate 46 fit into corresponding recesses in structure 39 to maintain the alignment of plate 46 during pivoting. Similar dimples (not shown) are located on the top of plate 44.

Plate 46 is cut-away in FIG. 1 to show a damper 67 mounted on a plate 40 of support structure 39. Damper 67 can be made of foam or an elastic polymer, such as SORBOTHANE, or any other damping material. Damper 67 slows the closing of plate 46 in response to coil 60 to avoid a quick snap closing which is mechanically jarring. A post 69 (shown in phantom) holds damper 67 in place). Damper 67 is shown in the shape of a cone so that it can compress by deforming to give a roughly linear damping force. Other shapes could be used, such as a doughnut shape. A similar damper (not shown) is positioned between plate 40 and plate 44.

FIG. 2 shows the front end of lifter plates 44, 46 from the opposite side of that shown in FIG. 1. Here, the top and bottom lift members 50', 52', 54' and 56' are offset to allow them to be placed closer together.

FIG. 3A shows a side view of head lifter mechanism 38 when the disk drive is in operation, and FIG. 3B shows head lifter mechanism 38 when the disk drive is inoperative and the heads are lifted away from the disks. As can be seen from FIG. 3A, extending members 54 and 56 are joined by a plate 62, while extending members 50 and 52 are joined by a plate 64. An extending member 66, which is a part of support structure 39, provides a stop against the movement of members 56, 50 to prevent lifter arm plates 44 and 46 from moving too far.

Support structure 39 includes a plate 40 (FIGS. 1, 3A and 3B), which is connected to stud 42 and a housing 41 for enclosing electromagnetic coil 60. Lifter arm plates 44 and 46 are made of iron in the portions adjacent to electromagnetic coil 60 (shown in phantom in FIG. 3A). Coil 60 includes a core 61, but this core is magnetic in order to provide a low reluctance path for the flux. Plates 44, 46 and members 50, 52, 54 and 56 are nonmagnetic to avoid interfering with the magnetic data on a disk. The iron portions of lifter arm plates 44 and 46 shunt the flux from electromagnetic coil 60 so that it does not extend into the disk area. Should the flux for certain applications become excessive, a shield could be employed.

Spring 48 exerts a lever arm effect on lifter arm plates 46 and 44, causing the plates to rotate about a fulcrum formed by beveled edges 47. Because of this lever arm effect, coil 60, which is close to fulcrum edges 47, can cause a large movement in the portion of plates 46 and 44 adjacent the disks through a small movement of the portion of the plates adjacent the coil. Thus, a large amount of current is not required to move the lifter arms away from the head arms. When current is shut off, spring 48 operates to lift the heads away from the disks, thus giving a fail-safe mode.

As will be understood by those familiar with the art, the present invention may be embodied in other specific forms without departing from the spirit or essential characteristics thereof. For example, in a disk drive using a four disk stack, four members may be attached to each of the lifter arm plates to enable each lifter arm to separate four disk heads from the disks. Alternately, instead of using a lever arm, the lifter plates could be held by springs on two ends to insure the plates stay level. It may be desirable to have the plates level where space is confined in a four disk stack. Accordingly, the disclosure of the preferred embodiment of the invention is intended to be illustrative, but not limiting, of the scope of the invention which is set forth in the following claims.

What is claimed is:

1. An apparatus for lifting first and second heads away from the top and bottom surfaces of a disk, respectively, in a disk drive, said heads being mounted on first and second head arms, respectively, comprising:
   a first lifter arm having first and second ends, said first end extending between said first head and said top surface of said disk;
   a second lifter arm having first and second ends, said first end of said second lifter arm extending between said second head and said bottom surface of said disk;
   at least one fulcrum contacting said first and second lifter arms proximate said second ends;
   means for biasing said first ends of said first and second lifter arms away from each other about said fulcrum so that said first lifter arm forces said first head arm away from said disk and said second lifter arm forces said second head arm away from said disk; and
   an electromagnet mounted between said lifter arms and between said fulcrum and said first ends of said lifter arms for moving said first and second lifter arms toward each other.

2. The apparatus of claim 1 wherein said biasing means comprises a spring coupling said second end of said first lifter arm to said second end of said second lifter arm.

3. The apparatus of claim 1 wherein each of said lifter arms includes an iron plate adjacent to said electromagnet.

4. The apparatus of claim 1 wherein said disk drive includes a plurality of disks and a plurality of heads and head arms, each disk having a head arm and head extending across a top surface and a bottom surface of said disk, said apparatus further comprising:
   at least one first member coupled to said first end of said first lifter arm, each said first member extending between one of said head arms and one of said top surfaces of said disks; and
   at least one second member coupled to said first end of said second lifter arm, each said second member extending between one of said head arms and one of said bottom surfaces of said disks.

5. An apparatus for lifting first and second head arms away from the top surfaces of first and second disks, respectively, and for lifting third and fourth head arms away from the bottom surfaces of said first and second disks, respectively, comprising:
   a first lifter plate having first and second ends;
   first and second vertically displaced lifter arms extending from said first end of said first lifter plate to between said first head arm and said top surface of said first disk and between said second head arm and said top surface of said second disk, respectively;
   a second lifter plate having first and second ends;
   third and fourth vertically displaced lifter arms extending from said first end of said second lifter plate to between said third head arm and said bottom surface of said first disk and between said fourth head arm and said bottom surface of said second disk, respectively;

a spring coupling said second ends of said first and second lifter plates for biasing said first ends of said lifter plates away from each other so that said first and second lifter arms force said first and second head arms away from said disks and said third and fourth lifter arms force said third and fourth head arms away from said disks;

at least one fulcrum member contacting said first and second lifter plates proximate said second ends; and an electromagnetic coil mounted between said first and second lifter plates and between said fulcrum member and said first ends of said lifter plates for biasing said first ends of said lifter plates toward each other.

6. The apparatus of claim 5 wherein portions of said lifter plates adjacent said electromagnetrc coil have magnetic permeability.

7. The apparatus of claim 5 further comprising a magnetic core mounted in the middle of said electromagnetic coil.

8. The apparatus of claim 7 wherein said core has a hollowed portion proximate said fulcrum member.

9. The apparatus of claim 5 furtner comprising a stop member mounted between said first ends of said first and second plates and extending between said second and third litter arms to limit the vertical movement of said lifter arms.

10. The apparatus of claim 9 further comprising means for damping the movement of said lifter plates.

* * * * *

UNITED STATES PATENT AND TRADEMARK OFFICE
CERTIFICATE OF CORRECTION

PATENT NO. : 4,787,000
DATED : November 22, 1988
INVENTOR(S) : Dieter M. Schulze It is certified that error appears in the above-identified patent and that said Letters Patent is hereby corrected as shown below:

On the title page Insert

--(73) Assignee: Microscience International Corporation, Sunnyvale, CA 94086 --.

Signed and Sealed this

Twenty-fifth Day of April, 1989

Attest:

DONALD J. QUIGG

Attesting Officer

Commissioner of Patents and Trademarks